US012571260B2

(12) United States Patent
Ustach et al.

(10) Patent No.: US 12,571,260 B2
(45) Date of Patent: Mar. 10, 2026

(54) STOWABLE STEP

(71) Applicant: McCue Corporation, Danvers, MA (US)

(72) Inventors: Thomas Ustach, Boston, MA (US); Teodoro A. Mesa, Lynn, MA (US)

(73) Assignee: McCue Corporation, Danvers, MA (US)

( * ) Notice: Subject to any disclaimer, the term of this patent is extended or adjusted under 35 U.S.C. 154(b) by 382 days.

(21) Appl. No.: 18/112,719

(22) Filed: Feb. 22, 2023

(65) Prior Publication Data

US 2023/0265716 A1 Aug. 24, 2023

Related U.S. Application Data

(60) Provisional application No. 63/312,927, filed on Feb. 23, 2022.

(51) Int. Cl.
*E06C 9/06* (2006.01)

(52) U.S. Cl.
CPC .................................... *E06C 9/06* (2013.01)

(58) Field of Classification Search
CPC .................................................... E06C 9/06
See application file for complete search history.

(56) References Cited

U.S. PATENT DOCUMENTS 608,617 A * 8/1898 Millen .................... B60R 3/02 182/91
1,169,140 A * 1/1916 Warren .................. B61D 23/02 182/91
2,897,910 A * 8/1959 Steely .................... A47B 31/00 182/15
4,462,486 A * 7/1984 Dignan .................... B60R 3/02 280/166
4,542,805 A 9/1985 Hamlin et al.
5,131,492 A * 7/1992 Caminiti ................ A47B 77/10 182/91
5,730,388 A 3/1998 Alder et al.
7,111,859 B2 * 9/2006 Kim .......................... B60R 3/02 280/166
2009/0308688 A1 12/2009 Tayar
2013/0186709 A1 * 7/2013 White ...................... E06C 9/06 182/89
2020/0392787 A1 * 12/2020 Navarro .................. E06C 1/005
2024/0247684 A1 * 7/2024 Yamane .................... F16B 2/10

* cited by examiner

*Primary Examiner* — Daniel J Troy
(74) *Attorney, Agent, or Firm* — Young Basile Hanlon & MacFarlane, P.C.

(57) ABSTRACT

An apparatus comprises a stowable step including a mounting plate, a platform for supporting a load when the platform is in a deployed position in which the platform is perpendicular to the mounting plate, and a folding assembly that enables the platform to transition between the deployed position and a stowed position in which the platform is parallel to the mounting plate. The stowable step also includes a pedal assembly that enables a transition between the deployed position and the stowed position to be completed by a person's foot. When the pedal assembly is pressed, while the stowable step is in the deployed position, the folding assembly transitions out of the deployed position and when the pedal assembly is pressed, while the stowable step is in the stowed position, the folding assembly transitions out of the stowed position.

17 Claims, 9 Drawing Sheets

STOWABLE STEP

CROSS-REFERENCES TO RELATED APPLICATIONS

This application claims the benefit of U.S. Provisional Application No. 63/312,927 filed on Feb. 23, 2022. The entire contents of U.S. Provisional Application No. 63/312,927 are incorporated herein by reference.

BACKGROUND

This invention relates to a stowable step for usage in contexts where users may need to step upon an object to reach something that is out of reach but does not require more significant means of gaining height (e.g., a ladder or stair).

It is often the case that in, e.g., warehouses, distribution centers, factories, or similar facilities, employees or other persons frequently need to access stock (i.e., products or other objects) stored vertically (e.g., in shelving units), and, generally in such contexts, obtaining such stock quickly is important. While ladders, movable stairs, and similar mechanisms are often used in such contexts, the entirety of such mechanisms are often not necessary when a person needs to grab stock that is only slightly out of reach.

In such contexts, a step may be more convenient for usage in grabbing elevated stock. However, small steps are often out of the eyesight of potential users while moving, and can thereby pose a hazard, especially when such environments are fast-paced and demand speedy movement and collection of objects.

Thereby, there is a present demand in the art for a step that may be small, quickly usable, easily transportable to various locations along vertical storage units, and stowable, such that the step does not pose a hazard to persons retrieving stock.

SUMMARY

In a general aspect of the invention, an apparatus comprises a stowable step including a mounting plate, a platform, a folding assembly, and a pedal assembly. The platform supports a load when the platform is in a deployed position in which the platform is perpendicular to the mounting plate. The folding assembly enables the platform to transition between the deployed position and a stowed position in which the platform is parallel to the mounting plate. The pedal assembly enables a transition between the deployed position and the stowed position to be completed by a person's foot. When the pedal assembly is pressed, while the stowable step is in the deployed position, the folding assembly transitions out of the deployed position and when the pedal assembly is pressed, while the stowable step is in the stowed position, the folding assembly transitions out of the stowed position.

Embodiments of this aspect of the invention may include one or more of the following features.

Pressing the pedal assembly, causes the folding assembly to allow the platform to attain an equilibrium position that is between the deployed position and the stowed position so that the transition can be completed by the person's foot exerting a torque to cause the platform to leave the equilibrium position.

The pedal assembly, when pressed, causes the folding assembly to allow the platform to attain one of a plurality of equilibrium positions that are between the deployed position and the stowed position so that the transition can be completed.

The pedal assembly, when pressed while the stowable step is in the deployed position, results in a first torque and wherein the pedal assembly, when pressed while the stowable step is in the stowed position, results in a second torque, and wherein the first and second torques have the same direction.

The pedal assembly, when pressed by the person's foot while the stowable step is in the deployed position, results in a first torque and wherein the pedal assembly, when pressed by the person's foot while the stowable step is in the stowed position, results in a second torque, and wherein the first and second torques have opposite directions.

The pedal assembly comprises a pedal lever having a pedal at a distal end thereof, wherein a proximal end of the pedal lever is mounted to the mounting plate to permit the pedal lever to pivot in response to being pressed by the person's foot.

The apparatus further comprises a linkage that connects the pedal assembly to the folding assembly.

The folding assembly comprises a spring that biases the pedal assembly such that the pedal assembly exerts a force opposite that caused by the pressing. The platform may be biased towards the deployed position.

The folding assembly comprises a rotating cam and a yoke, wherein rotating the cam moves the yoke into a position at which the platform is free to rotate about the mounting plate.

The folding assembly comprises a spring, wherein, in the deployed position, the platform's weight exerts a downward force that biases the pedal assembly upwards and wherein, when not in the deployed position, the spring biases the pedal assembly upwards.

The folding assembly comprises a cam that comprises a control surface, a yoke that comprises a base and arms extending from the base, a rib having upper and lower guide-slots cut therethrough, a support bar that extends parallel to the base, wherein the yoke's base rests on the control surface such that rotation of the cam lifts the yoke off the support bar and causes the base to travel upward along the upper guide-slot while causing the support bar to travel down the lower guide-slot.

The mounting plate comprises a hook rib having a downwardly opening recess, wherein the pedal assembly comprises a pedal lever having a pedal at a distal end thereof. A proximal end of the pedal lever is mounted to the mounting plate. The hook rib is disposed to permit the pedal lever to move along the recess during pivoting of the pedal lever, and the pedal lever is biased upwards to press against the hook rib.

The apparatus further comprises a rail to which the mounting plate is attached and stairs that roll along the rail, wherein, in the deployed position, the stowable step is an impediment to rolling the stair along the rail and wherein, in the stowed position, the stowable step ceases to be an impediment to rolling the stair along the rail.

The folding assembly and the platform define a dynamic system having a potential energy function that depends on an angle between the platform and the mounting plate. Between the deployed position and the stowed position, there exists at least one angle at which the potential energy function as a zero first derivative and a positive second derivative. The pedal assembly, when pressed by the person's foot, causes the folding assembly to allow the platform to attain the angle so that the transition can be completed to exert a torque to cause the platform to leave the angle.

In another general aspect of the invention, a method comprises operating a stowable step that has a stowed position, in which the step is parallel to a mounting plate, and a deployed position, in which the step is perpendicular to the mounting rail, wherein operating the stowable step comprises using the foot to: press on a pedal assembly to cause the step to transition out of the deployed position, complete the transition out of the deployed position into the stowed position, press on the pedal assembly to cause the step to transition out of the stowed position, and complete the transition out of the stowed position into the deployed position.

Embodiments of this aspect of the invention may include one or more of the following features.

The method further includes causing the step to transition out of the deployed position comprises causing the step to transition into an equilibrium position that is in between the deployed position and the stowed position and wherein completing the transition into the stowed position comprises causing a transition from the equilibrium position to the stowed position.

The method further includes pressing on a pedal assembly to cause the step to transition out of the deployed position comprises exerting a first torque and pressing on the pedal assembly to cause the step to transition out of the stowed position comprises exerting a second torque, wherein the first and second torques are in the same direction.

The method further includes pressing the pedal assembly to cause the step to transition out of the deployed position comprises overcoming a bias force and completing the transition into the stowed position comprises overcoming the bias force.

The foot used to press on the pedal assembly to cause said step to transition out of said deployed position comprises is the same foot that used to press on said pedal assembly to cause said step to transition out of said stowed position Among other advantages, a stowable step, as well as its method of use, is provided that is small, quickly usable, easily transportable to various locations along vertical storage units, stowable, and does not pose a hazard to persons retrieving stock.

Other features and advantages of the invention are apparent from the following description, and from the claims.

DESCRIPTION

Figure 1:
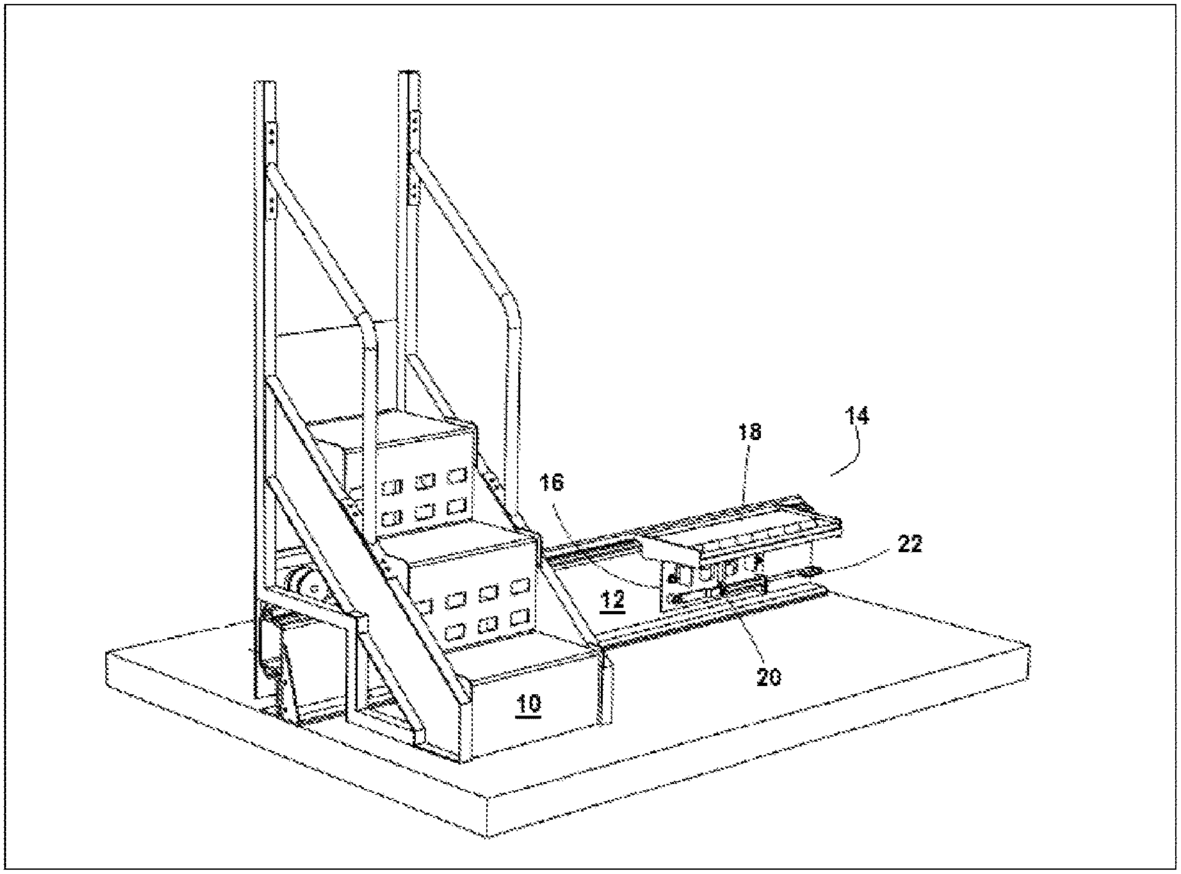
FIG. 1 is a stowable step positioned on a warehouse rail fixture alongside a rolling stair.

FIG. 1 shows stairs 10 that roll back and forth along a rail 12. The stairs 10 are useful for reaching items that are too high to reach while standing on the floor. Such stairs 10 are particularly useful in a warehouse in which workers pick items from various shelves.

In a typical warehouse, there will be several workers reaching for different items at the same time. As a result, there will inevitably be some competition for using the stairs 10. Although it is possible to provide multiple instances of stairs 10, such stairs 10 are costly. In addition, stairs 10 cannot easily overtake each other when on a rail 12. Thus, a warehouse worker may see a free set of stairs 10 nearby and still be unable to use them because an intervening set of stairs 10 is in use.

To address this difficulty, it is useful to have one or more stowable steps 14 as shown in FIG. 1. Each stowable step 14 includes a mounting plate 16 that has been bolted to the rail 12. The mounting plate 16 supports a platform 18 that transitions between transitions between deployed and stowed positions as a result of interaction with a folding system 20. In the deployed position, the platform 18 is at right angles to the rail 12, thus permitting it to be stood upon. In the stowed position, the platform is parallel to the rail 12 and thus stays out of foot traffic. Stairs 10 can roll past stowable step 14 regardless of whether the step is in its deployed or stowed position.

To reach an object, a warehouse worker can thus place the platform 18 into its deployed position, reach for and retrieve the object, and then restore the platform 18 to its stowed position so that others will not trip over it. While this step 14 may not enable one to reach the very highest locations, it is nevertheless a boon to efficiency.

To cause the step 14 to transition between these configurations, the warehouse worker need only interact with a folding mechanism 20 using a pedal assembly 22 that is coupled to a folding mechanism 20.

Figure 2:
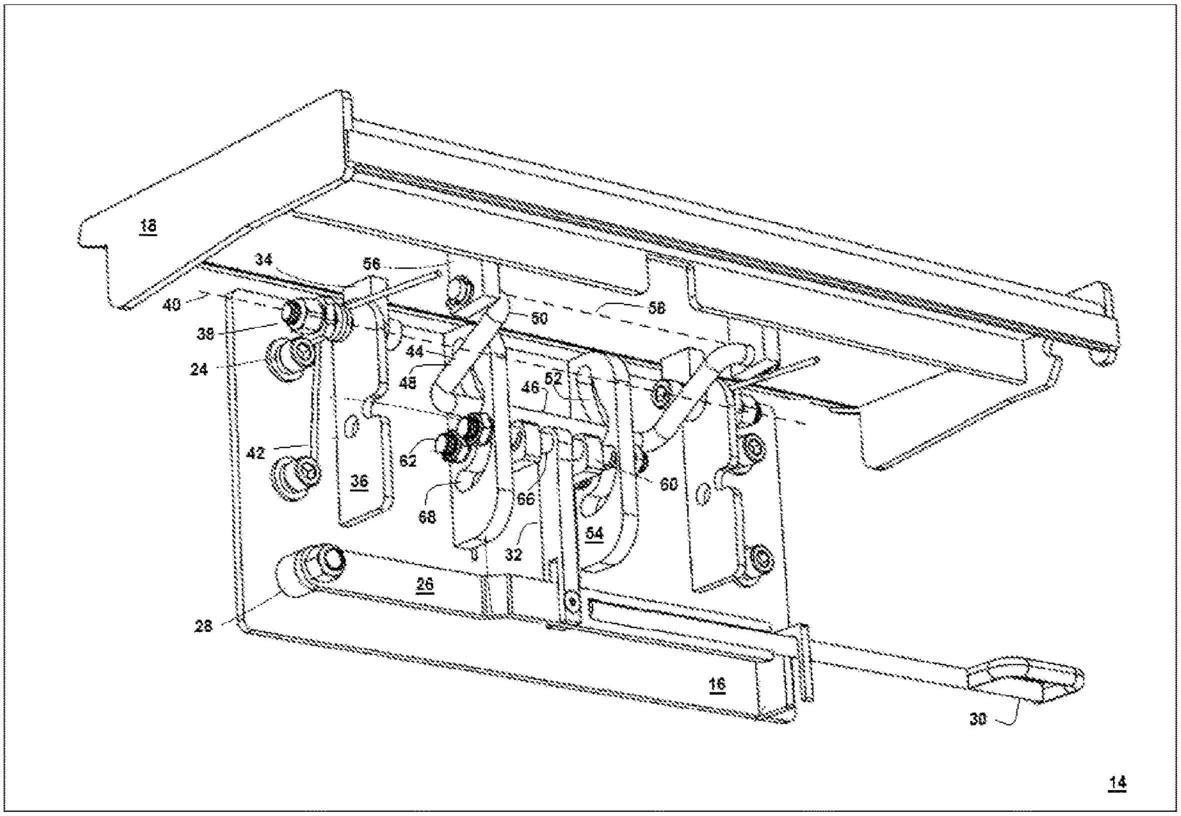
FIG. 2 is a perspective view of the stowable step shown locked in a deployed configuration.

Referring now to FIG. 2, the mounting plate 16 shown in FIG. 1 is bolted to the rail 12 by plate-mounting bolts 24. The pedal assembly 22 includes a pedal lever 26 that extends along the bottom edge of the mounting plate 16. The pedal lever's distal end is rotatably mounted to the mounting plate 16 by a pedal-mounting bolt 28. The pedal lever's proximal end supports a pedal 30.

The middle portion of the pedal lever 26 couples to the folding assembly 20 via a linkage 32. By pressing down on the pedal 30, a warehouse worker exerts a downward force on this linkage 32, which in turn causes the step 14 to enter a state in which it can be made to transition between its stowed and deployed positions.

With reference to the deployed position, the step's platform 18 has a proximal edge nearest the mounting plate 16 and a distal edge that is furthest from the mounting plate 16. Proximal platform-ribs 34 project from the proximal edge of the platform's underside on either side of the platform's center line. These proximal platform-ribs 34 align with corresponding outer mounting-plate ribs 36 that project from the mounting plate 16 on either side of its center line. Holes in the outer mounting-plate ribs 36 align with corresponding holes in the proximal platform-ribs 34 to accommodate corresponding pins 38, thereby forming a hinge that that swings about a hinge axis 40. The platform 18 pivots about this hinge axis 40 when transitioning between its two configurations.

Each pin 38 holds a corresponding hinge spring 42 against a corresponding one of the outer mounting-plate ribs 36. The hinge spring 42 is a torsion spring that exerts a restoring force in response to the platform's deviation from an equilibrium angle relative to the rail 12. This equilibrium angle is between the angle that the platform 18 assumes in its deployed position and the angle that it assumes in its stowed position. Its value depends on the hinge spring's spring constant and the mass distribution of the platform 18, determines the torque that results from its mass. As a result, the warehouse worker can either kick the platform 18 upwards so that it locks into the deployed position or press the platform 18 further downwards to lock it into its stowed position.

The folding assembly 20 and the platform 18 define a dynamic system in which potential energy varies as a function of the angle between the platform 18 and the mounting plate 16. The resulting potential energy function will have one or more angles at which its first derivative is zero and its second derivative is positive. These angles correspond to one or more corresponding stable equilibrium angles. When the stowable step 14 is not in one of the deployed and stowed states, it will settle into such an equilibrium angle.

The folding assembly 20 includes a yoke 44 having a base 46 and two arms 48 that are perpendicular to the base 46. The base 46 extends between the two arms 48. Each arm 48 ends in an elbow 50 having a right-angle bend that forms the arm's distal end. The arm's distal end is thus parallel to the base 46. The yoke's overall shape is thus similar to that of the Greek letter "Ω."

The base 46 of the yoke 44 passes through upper guide-slots 52 that have been formed in first and second inner mounting-plate ribs 54 that project outward from the mounting plate 16 between the outer mounting-plate ribs 34. As a result, the base 46 of the yoke 44 is free to follow a substantially vertical but curved path defined by the upper guide-slot 52. When the base 46 is at the bottom of the upper guide-slot 52, as shown in FIG. 2, the platform 18 is locked in position. When the base 46 is at the top of the upper guide-slot 52 so that it aligns with the hinge axis 40, the platform 18 is free to rotate about the hinge axis 40.

Each distal end of the yoke 44 passes through a hole in a corresponding distal platform-rib 56 that projects from the distal edge of the platform's underside. As a result, the elbows 50 are free to rotate about an elbow axis 58 that is parallel to the hinge axis 40 while the platform 18 is transitioning between its two states.

Figure 3:
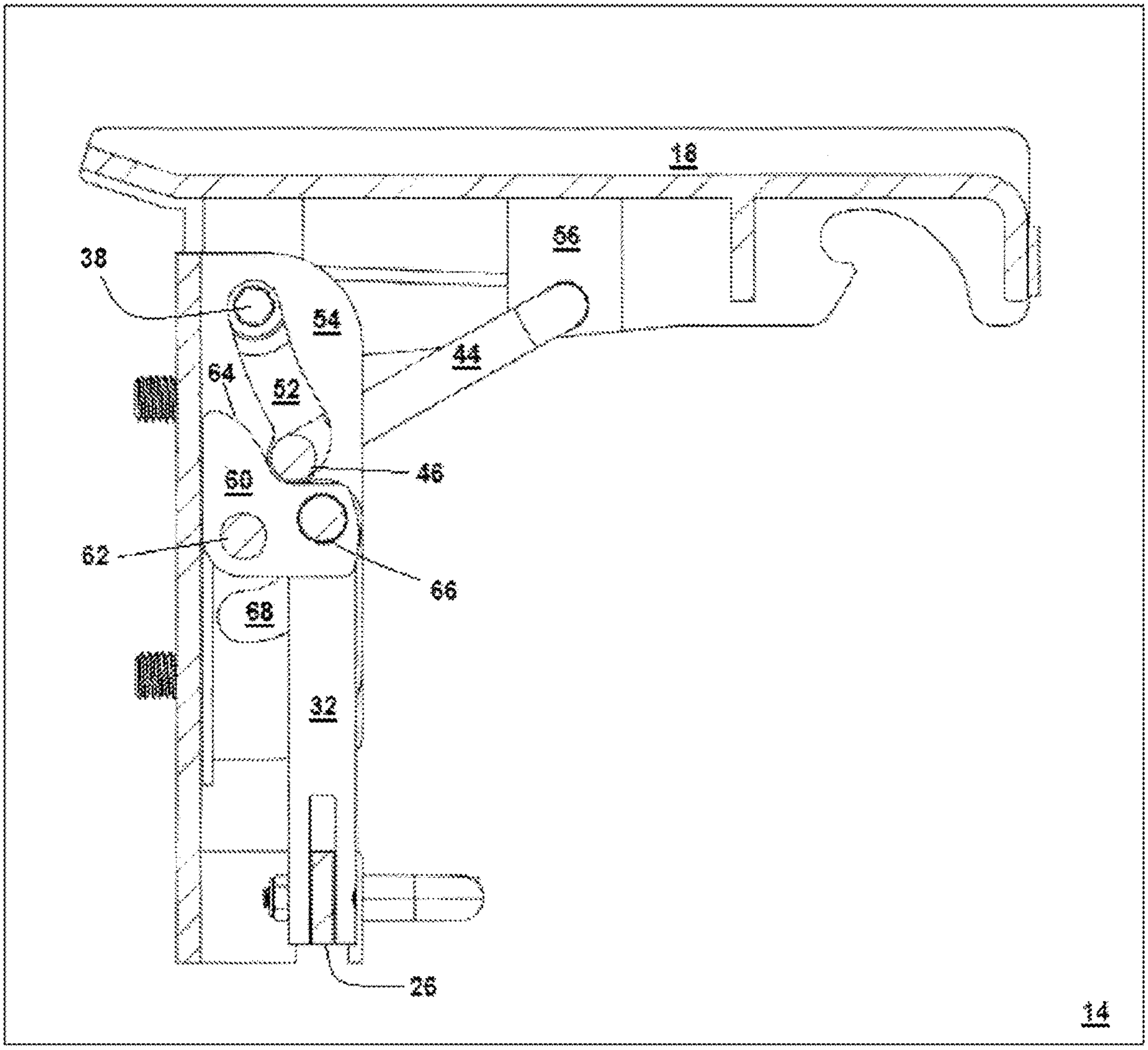
FIGS. 3-4 are cross-sectional side views of the stowable step of FIG. 2.

In FIG. 2, the yoke's base 46 rests on first and second cams 60 that rotate about respective first and second bearings 62. As the cams 60 rotate, they control the location of the yoke's base 46. The cam 60, which is best seen in FIG. 3, has a control surface 64 having a nose, a chin, and a throat. In FIG. 3, the yoke's base 46 rests between the control surface's chin and the throat. By rotating the cams 60 about their respective cam bearings 62, it is possible to move the yoke's base 46 up and down along the upper guide slot 52.

A support bar 66 passes through lower guide-slots 68 in the inner mounting-plate ribs 54. As such, the support bar 66 is free to follow a substantially curved path defined by the lower guide-slots 68.

Figure 4:
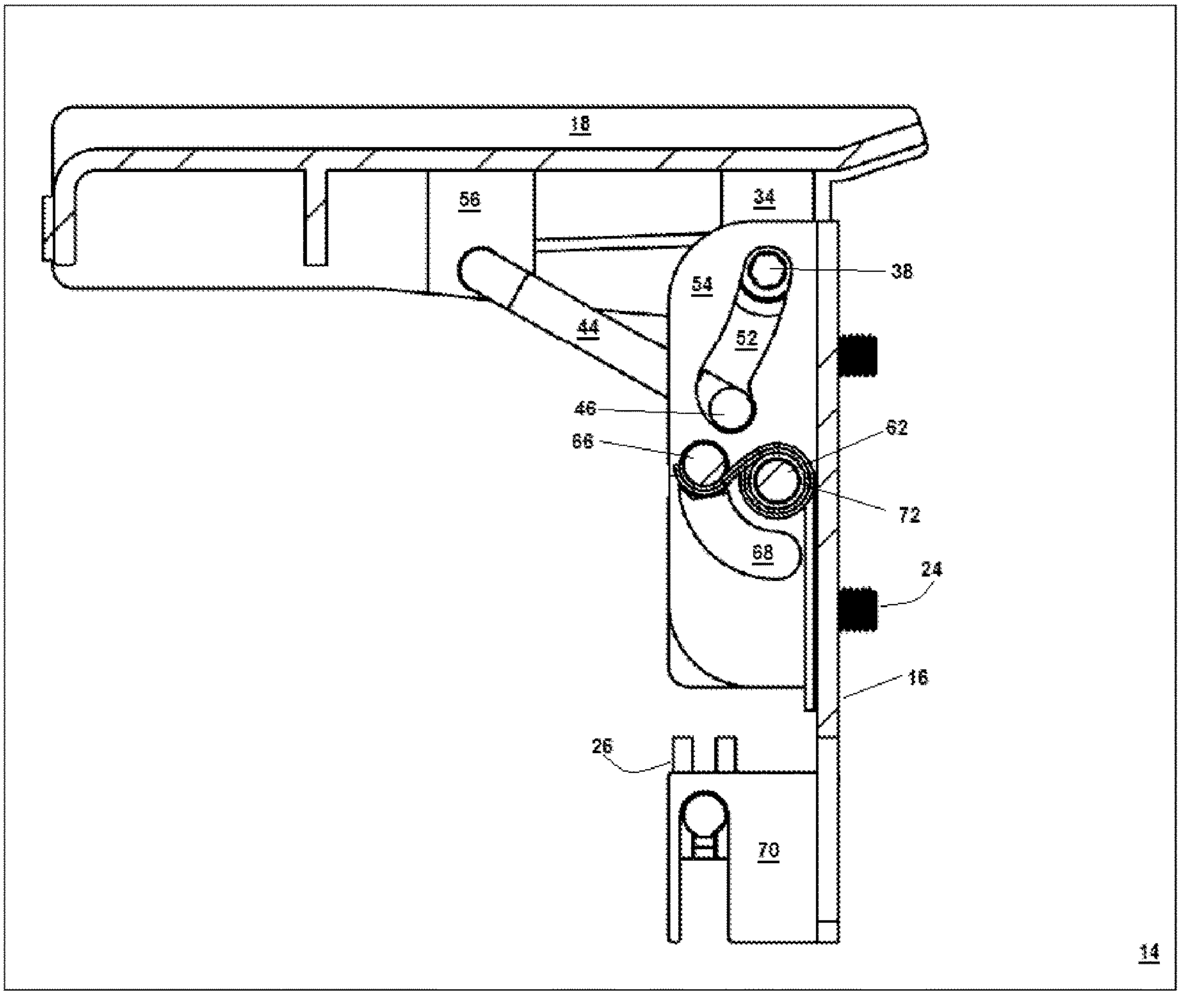

As is apparent from FIG. 2 and FIG. 4, when the platform 18 is in its deployed position, the yoke's arms transmit a force due to the platform's weight to the cams 60. A moment arm between the cam's bearing 62 and the support bar 66 means that a torque that urges the cams 60 to rotate about their respective cam bearings 62 would also urge the support bar 66 upwards. As a result, when the platform 18 is in the position shown in FIG. 3, the support bar 66 exerts an upward force on the linkage 32 to which it connects. This, in turn, results in a torque on the pedal lever 26 that urges it into a downwardly opening recess of a hook 70 that projects from the mounting plate 16. As a result, the pedal lever 26 does not simply fall out of this recess.

Pressing the pedal 30 downward rotates the pedal lever 26 about the pedal-mounting bolt 28 so that the pedal lever 26 can be freed from entrapment by the hook rib 70. This releases the restraint that prevented the upward motion of the support bar 66, thus setting into motion the reconfiguration of the folding assembly 20 into the stowed position, as shown in the steps illustrated in FIGS. 3-9.

As a starting point for illustrating the transition, FIGS. 3 and 4 show cross-sectional views of the stowable step 14 in the deployed position.

As is apparent from FIG. 3, in the deployed position, the base 46 of the yoke 44 rests at a junction of the control surface's chin and throat. As can be seen in FIG. 4, in the deployed position, the base 46 of the yoke 44 is at the bottom of the upper guide-slot 52 and the support bar 66 is at the top of the lower guide-slot.

As shown in FIG. 4, the folding assembly 20 further includes a biasing spring 72 that applies a biasing force to urge the support bar 66 upwards. Since the support bar 66 connects to the pedal lever 26 via the linkage 32, this also biases the pedal lever 26 upwards during those times in which the yoke 44 is no longer supplying this upward force.

Figure 5:
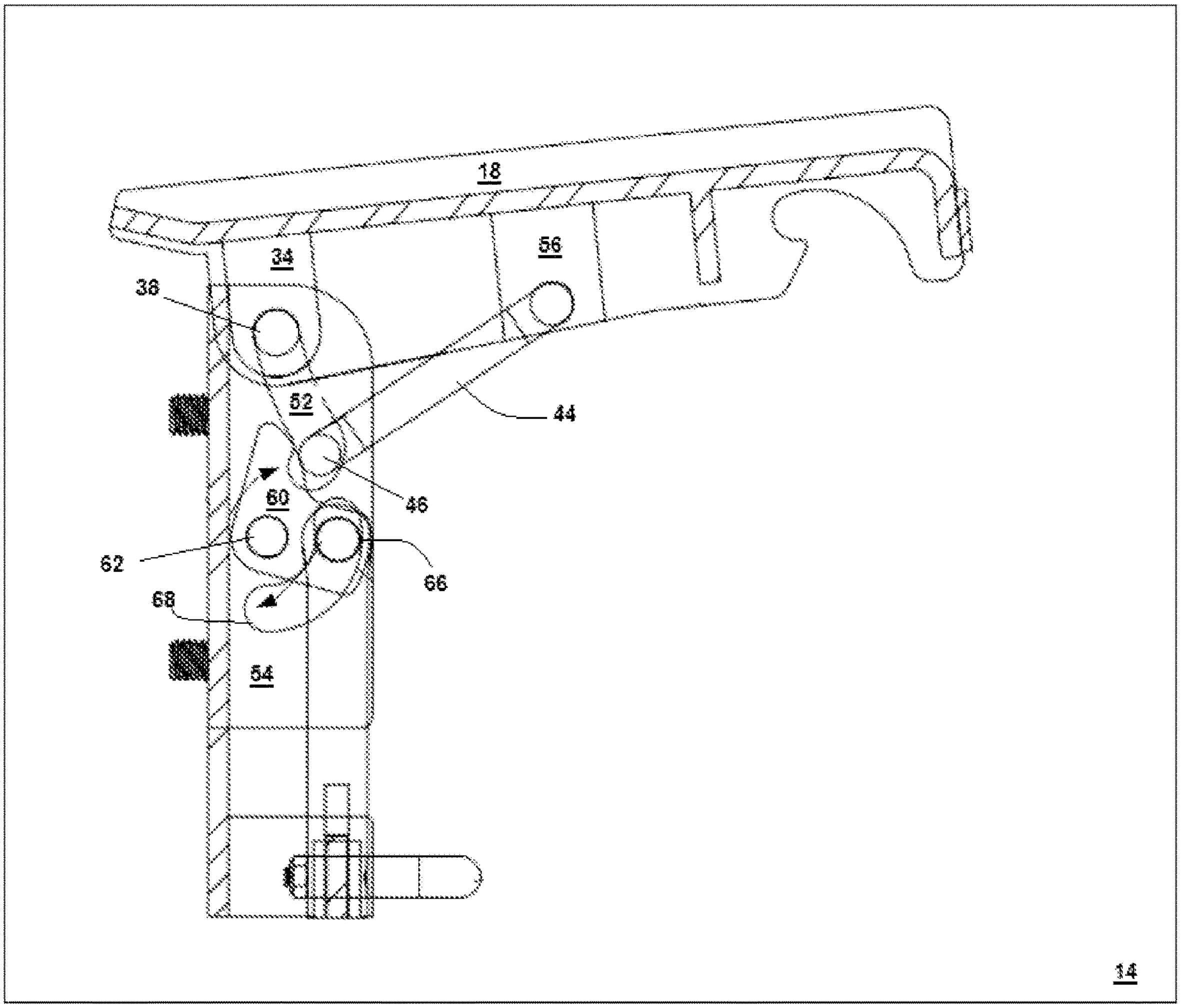
FIGS. 5-9 show a progression of the stowable step as it transitions from a deployed configuration to a stowed configuration.

FIG. 5 shows the base 46 of the yoke 44 as it makes its way up the control surface's chin and towards its nose, all the while following the path defined by the upper guide-slot 52 of the inner mounting-plate rib 54. Similar activity takes place on the other inner mounting-plate rib, which is not visible. As the cam 60 pivots clockwise, the support bar 66 moves downward along the lower guide-slot of the inner mounting plate rib 54. In this state, the platform 18 momentarily makes an angle in excess of a right angle relative to the rail 12.

Figure 6:
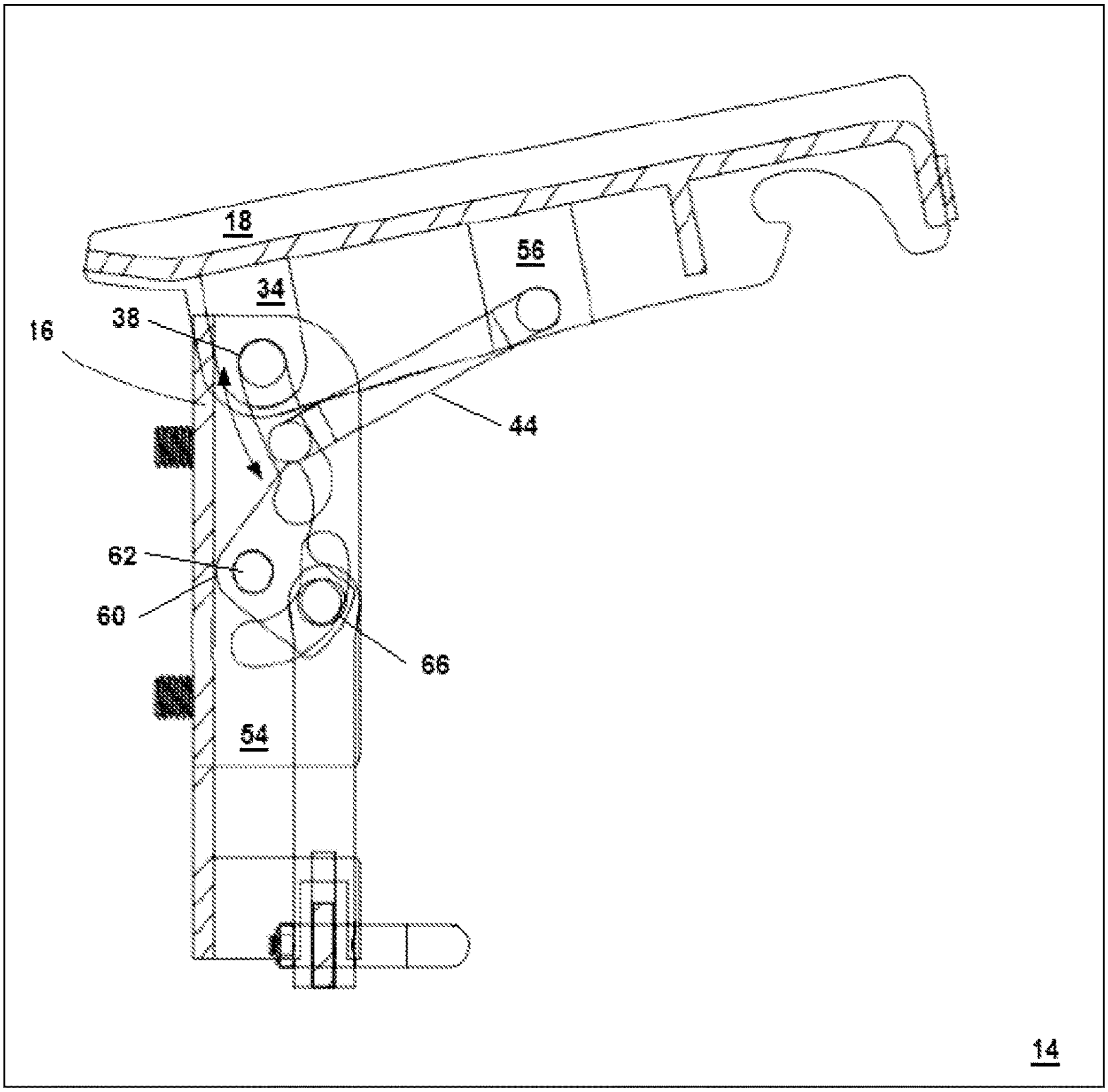

In FIG. 6, the base 46 of the yoke 44 is now balanced on the nose of the cam 60 as the support bar 66 continues its way down the lower guide-slot, pivoting the cam 60 as it does so. The angle made by the platform 18 continues to increase.

Figure 7:
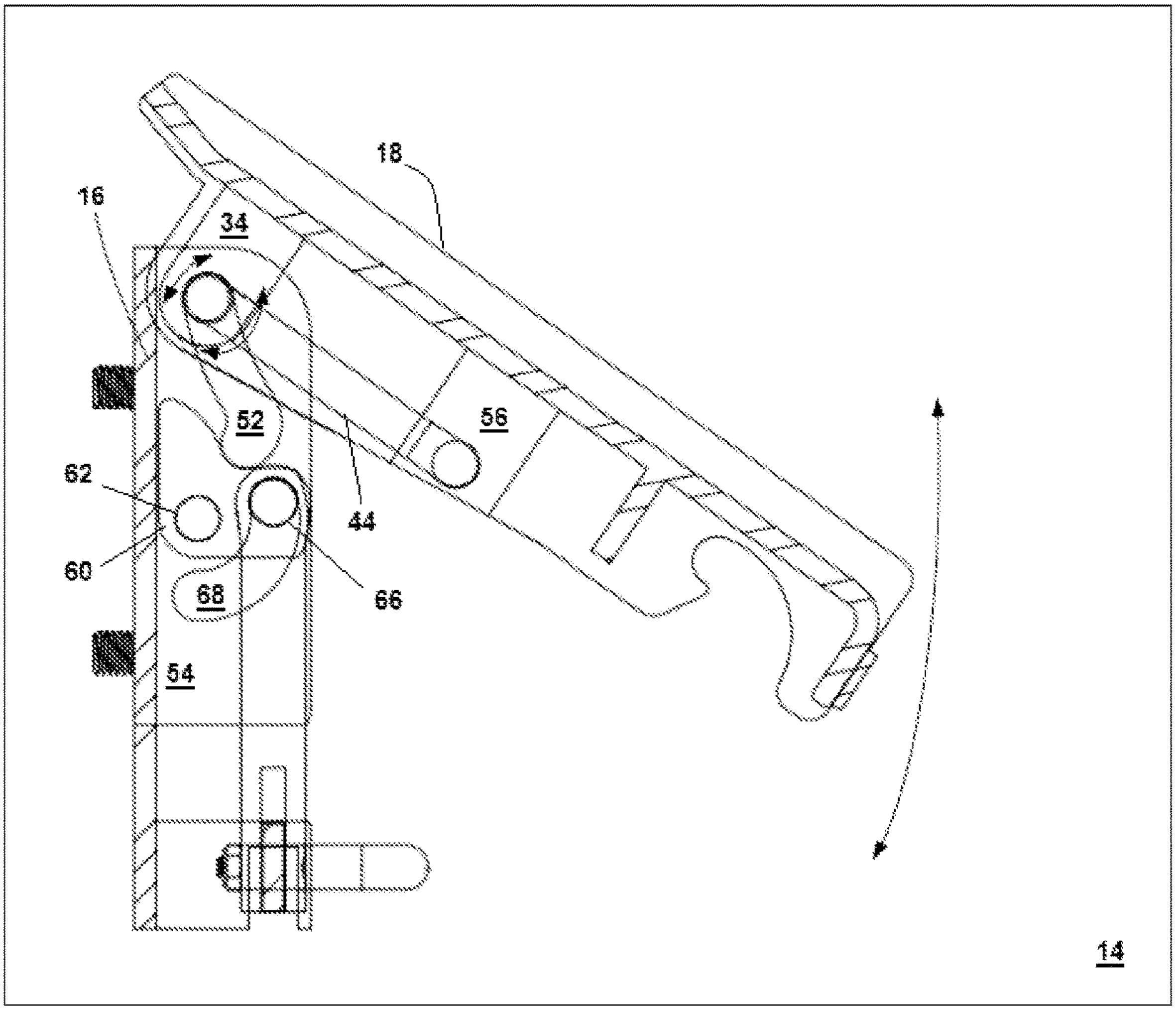

In FIG. 7, the base 46 of the yoke 44 has reached the hinge axis 40 and is now aligned so that the platform 18 can begin to pivot downwards. Additionally, the cam 60 has swung back into the position that it occupied in FIG. 3.

Figure 8:
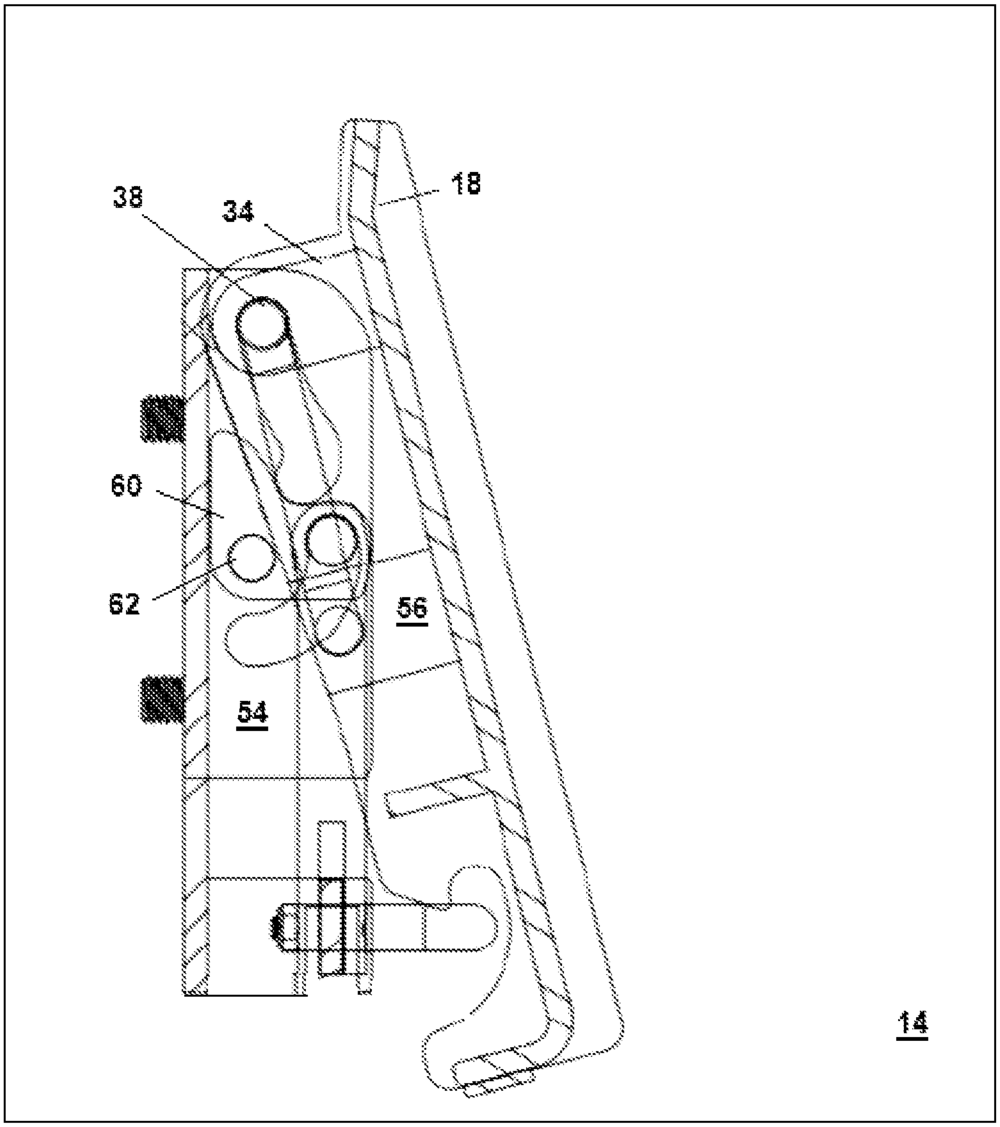
Figure 9:
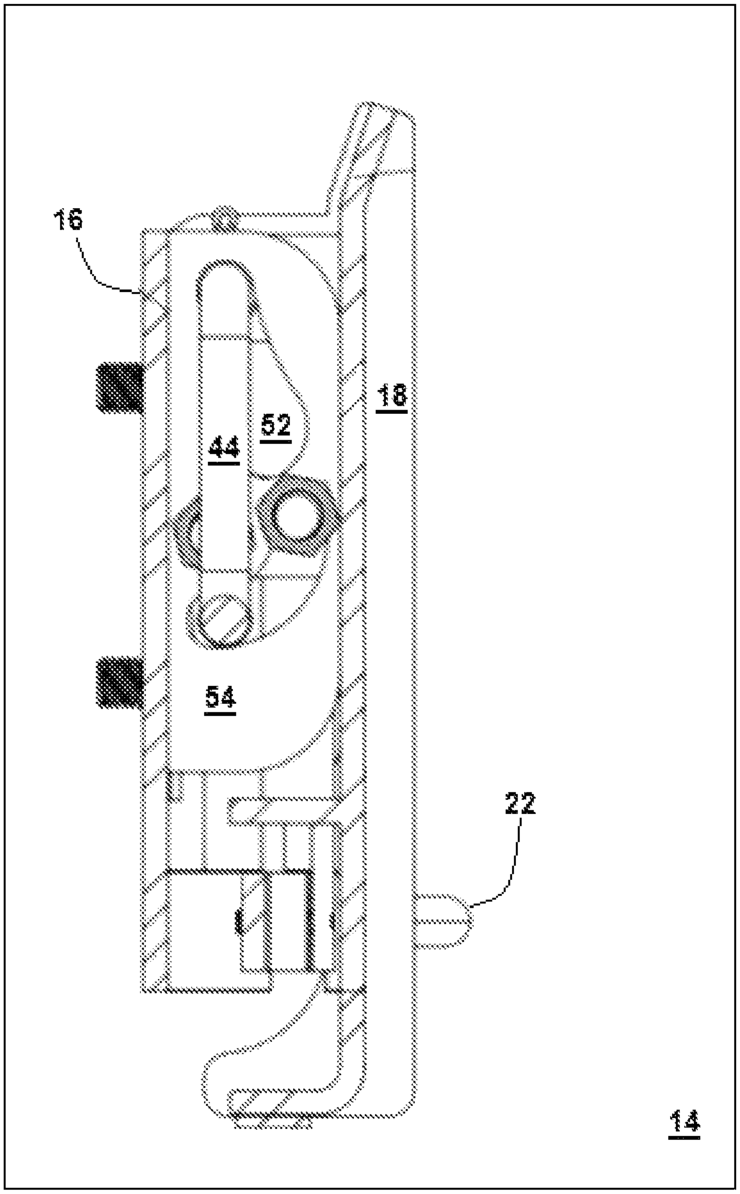

FIG. 8 shows the platform 18 continuing to pivot downwards as it approaches the stowed position shown in FIG. 9. The platform 18 continues to be biased upward by the biasing spring 72 and is thus able to positively engage the hook 70, thereby locking the platform 18 into the stowed position. In this position, pushing down on the pedal 30 enables the pedal lever 26 to escape the recess, thus permitting the platform 18 to be swung into the deployed position by the worker's foot.

It is apparent therefore that the stowable step 14 is entirely operable by a worker's foot. This is particularly useful because a worker's hands may be occupied by carrying one or more objects.

Because the stowable step 14 is biased to attain an equilibrium position, it is not prone to swinging down and striking the mounting plate 16 when released. Moreover, if a worker is unsuccessful in stowing the step 14, it will at least come to rest at a position in which it protrudes from the rail 12 less than it would if it were fully deployed.

It is to be understood that the foregoing description is intended to illustrate and not to limit the scope of the invention, which is defined by the scope of the appended claims. Other embodiments are within the scope of the following claims.

What is claimed is:

1. An apparatus comprising a stowable step, said stowable step comprising a mounting plate, a platform for supporting a load when said platform is in a deployed position in which said platform is perpendicular to said mounting plate, a folding assembly that enables said platform to transition between said deployed position and a stowed position in which said platform is parallel to said mounting plate, and a pedal assembly that enables a transition between said deployed position and said stowed position to be completed by a person's foot, wherein pressing said pedal assembly, while said stowable step is in said deployed position, causes said folding assembly to transition out of said deployed position, wherein pressing said pedal assembly, while said stowable step is in said stowed position, causes said folding assembly to transition out of said stowed position, and wherein pressing said pedal assembly, causes said folding assembly to allow said platform to attain an equilibrium position that is between said deployed position and said stowed position so that said transition can be completed by said person's foot exerting a torque to cause said platform to leave said equilibrium position.

2. The apparatus of claim 1, wherein said pedal assembly, when pressed, causes said folding assembly to allow said platform to attain one of a plurality of equilibrium positions that are between said deployed position and said stowed position so that said transition can be completed.

3. An apparatus comprising a stowable step, said stowable step comprising a mounting plate, a platform for supporting a load when said platform is in a deployed position in which said platform is perpendicular to said mounting plate, a folding assembly that enables said platform to transition between said deployed position and a stowed position in which said platform is parallel to said mounting plate, and a pedal assembly that enables a transition between said deployed position and said stowed position to be completed by a person's foot, wherein pressing said pedal assembly, while said stowable step is in said deployed position, causes said folding assembly to transition out of said deployed position, wherein pressing said pedal assembly, while said stowable step is in said stowed position, causes said folding assembly to transition out of said stowed position, and, wherein said pedal assembly comprises a pedal lever having a pedal at a distal end thereof, wherein a proximal end of said pedal lever is mounted to said mounting plate to permit said pedal lever to pivot in response to being pressed by said person's foot.

4. The apparatus of claim 1, wherein said apparatus further comprises a linkage that connects said pedal assembly to said folding assembly.

5. The apparatus of claim 1, wherein said folding assembly comprises a spring that biases said pedal assembly such that said pedal assembly exerts a force opposite that caused by said pressing.

6. The apparatus of claim 1, wherein said platform is biased towards said deployed position.

7. The apparatus of claim 1, wherein said folding assembly comprises a rotating cam and a yoke, wherein rotating said cam moves said yoke into a position at which said platform is free to rotate about said mounting plate.

8. The apparatus of claim 1, wherein said folding assembly comprises a spring, wherein, in said deployed position, said platform's weight exerts a downward force that biases said pedal assembly upwards and wherein, when not in said deployed position, said spring biases said pedal assembly upwards.

9. The apparatus of claim 1, wherein said folding assembly comprises a cam that comprises a control surface, a yoke that comprises a base and arms extending from said base, a rib having upper and lower guide-slots cut therethrough, a support bar that extends parallel to said base, wherein said yoke's base rests on said control surface such that rotation of said cam lifts said yoke off said support bar and causes said base to travel upward along said upper guide-slot while causing said support bar to travel down said lower guide-slot.

10. The apparatus of claim 1, wherein said mounting plate comprises a hook rib having a downwardly-opening recess, wherein said pedal assembly comprises a pedal lever having a pedal at a distal end thereof, wherein a proximal end of said pedal lever is mounted to said mounting plate, wherein said hook rib is disposed to permit said pedal lever to move along said recess during pivoting of said pedal lever, and wherein said pedal lever is biased upwards to press against said hook rib.

11. The apparatus of claim 1, further comprising a rail to which said mounting plate is attached and stairs that roll along said rail, wherein, in said deployed position, said stowable step is an impediment to rolling said stair along said rail and wherein, in said stowed position, said stowable step ceases to be an impediment to rolling said stair along said rail.

12. The apparatus of claim 1, wherein said folding assembly and said platform define a dynamic system having a potential energy function that depends on an angle between said platform and said mounting plate, wherein, between said deployed position and said stowed position, there exists at least one angle at which said potential energy function as a zero first derivative and a positive second derivative, wherein said pedal assembly, when pressed by said person's foot, causes said folding assembly to allow said platform to attain said angle so that said transition can be completed to exert a torque to cause said platform to leave said angle.

13. The apparatus of claim 1, wherein said pedal assembly, when pressed while said stowable step is in said deployed position, results in a first torque and wherein said pedal assembly, when pressed while said stowable step is in said stowed position, results in a second torque, and wherein said first and second torques have the same direction.

14. A method comprising operating a stowable step that has a stowed position, in which said step is parallel to a mounting plate, and a deployed position, in which said step is perpendicular to a mounting rail, wherein operating said stowable step comprises using a foot to press on a pedal assembly to cause said step to transition out of said deployed position, complete said transition out of said deployed position into said stowed position, press on said pedal assembly to cause said step to transition out of said stowed position, complete said transition out of said stowed position into said deployed position, and wherein causing said step to transition out of said deployed position comprises causing said step to transition into an equilibrium position that is in between said deployed position and said stowed position and wherein completing said transition into said stowed position comprises causing a transition from said equilibrium position to said stowed position.

15. The method of claim 14, wherein pressing on a pedal assembly to cause said step to transition out of said deployed position comprises exerting a first torque and pressing on said pedal assembly to cause said step to transition out of said stowed position comprises exerting a second torque, wherein said first and second torques are in the same direction.

16. The method of claim 14, wherein pressing said pedal assembly to cause said step to transition out of said deployed position comprises overcoming a bias force and completing said transition into said stowed position comprises overcoming said bias force.

17. The method of claim 14, wherein using the foot to press on the pedal assembly to cause said step to transition out of said deployed position comprises using the same foot that was used to press on said pedal assembly to cause said step to transition out of said stowed position.

* * * * *